N. A. OTTO & F. W. & W. J. CROSSLEY.
Gas Motor Engine.

No. 196,473. Patented Oct. 23, 1877.

N. A. OTTO & F. W. & W. J. CROSSLEY.
Gas Motor Engine.

No. 196,473. Patented Oct. 23, 1877.

Attest:
H. L. Denne
J. A. Rutherford

N. A. Otto.
F. W. Crossley.
W. J. Crossley.
Inventor:

By James L. Norris
Attorney.

N. A. OTTO & F. W. & W. J. CROSSLEY.
Gas Motor Engine.

No. 196,473. Patented Oct. 23, 1877.

N. A. OTTO & F. W. & W. J. CROSSLEY.
Gas Motor Engine.

No. 196,473. Patented Oct. 23, 1877.

Attest:
H. L. Perrine
J. A. Rutherford

N. A. Otto.
F. W. Crossley.
W. J. Crossley.
Inventors.

By James L. Norris,
Attorney

N. A. OTTO & F. W. & W. J. CROSSLEY.
Gas Motor Engine.

No. 196,473. Patented Oct. 23, 1877.

Fig. 8.

Attest:
H. L. Brown
J. A. Rutherford

N. A. Otto.
F. W. Crossley.
W. J. Crossley.
Inventors.

By James L. Norris.
Attorney.

N. A. OTTO & F. W. & W. J. CROSSLEY.
Gas Motor Engine.

No. 196,473. Patented Oct. 23, 1877.

Fig. 10

Attest:
H. L. Perrine
J. A. Rutherford

N. A. Otto.
F. W. Crossley.
W. J. Crossley.
Inventors.
By James L. Norris,
Attorney

N. PETERS, PHOTO-LITHOGRAPHER, WASHINGTON, D. C.

N. A. OTTO & F. W. & W. J. CROSSLEY.
Gas Motor Engine.

No. 196,473. Patented Oct. 23, 1877.

N. A. Otto.
F. W. Crossley.
W. J. Crossley.
Inventors.

By James L. Norris.
Atty

Attest
H. L. Perrine
J. A. Rutherford

UNITED STATES PATENT OFFICE.

NICOLAUS A. OTTO, OF DEUTZ, GERMANY, AND FRANCIS W. CROSSLEY AND WILLIAM J. CROSSLEY, OF MANCHESTER, ENGLAND.

IMPROVEMENT IN GAS-MOTOR ENGINES.

Specification forming part of Letters Patent No. 196,473, dated October 23, 1877; application filed July 26, 1877; patented in England, June 4, 1877, for fourteen years.

*To all whom it may concern:*

Be it known that we, NICOLAUS AUGUST OTTO, of the Gas Motoren Fabrik Deutz, at Deutz, in the German Empire, and FRANCIS WILLIAM CROSSLEY and WILLIAM JOHN CROSSLEY, both of Great Marlborough street, Manchester, county of Lancaster, England, have invented an Improved Construction of Gas-Motor Engines; and do hereby declare that the following description, taken in connection with the accompanying drawings, hereinafter referred to, forms a full and exact specification of the same, wherein we have set forth the nature and principles of our said improvement, by which our invention may be distinguished from others of a similar class, together with such parts as we claim and desire to secure by Letters Patent—that is to say, for which invention Letters Patent were granted to us in England, June 4, 1877, and numbered 2,777.

Our invention relates to that class of gas-motor engines wherein the gaseous pressure inside a cylinder resulting from the combustion of a mixture of inflammable gas or vapor and air causes a piston to perform its stroke, the products of combustion being expelled by the return-stroke of the piston. According to one arrangement of such engines heretofore employed, the mixture of gas and air in the cylinder was of an explosive nature, so that on ignition the piston was propelled rapidly forward without doing work, the work being done by the return-stroke of the piston, effected by the pressure of the atmosphere against a partial vacuum formed behind the piston. According to another arrangement, described in the specification to N. A. Otto's patent, dated August 14, 1877, No. 194,047, a charge of air was first introduced into the cylinder, and then a charge of combustible mixture of gas and air, so that, the latter charge becoming more and more dispersed in the air at points more and more distant from the inlet-port, the combustion took place rapidly on first igniting the charge, and then proceeded more and more slowly as it extended to the front part of the charge, the object being to obtain a more gradual development of pressure, suited for imparting motion to a piston connected to a crank-shaft.

Now, according to our present invention, instead of producing a stratified condition of the combustible charge, such as is obtained by the means last above described, we effect a similar gradual development of the motive power by introducing into the cylinder a uniformly-diluted mixture of gas and air—that is to say, a mixture containing a greater proportion of air than the strong or explosive mixture, which only contains as much air as is necessary for the complete combustion of the combustible gas—so that on ignition this weak charge will burn with considerably less rapidity than the explosive mixture. If this charge were ignited in the ordinary way, either by an electric spark or by a small gas-flame, the combustion would proceed too slowly at first for producing a useful result. We therefore introduce into a separate passage or chamber, communicating with the cylinder and with the lighting-flame, a charge of strong or explosive mixture of gas and air, so that on ignition of this charge the resulting flame will be projected with some force from the passage or chamber into the cylinder, and, in being thus brought into extended contact with the diluted charge therein, will effect its more rapid ignition, causing the maximum pressure of the gases to be attained before the piston has performed any considerable part of its stroke. In this mode of operating, by varying the proportion existing between the strong and diluted charges—that is, by making the passage or chamber containing the strong charge larger or smaller, in proportion to the space in the cylinder containing the weak charge—the combustion may be made to take place quicker or slower, and thus the duration of combustion be adjusted to the required speed of the engine.

In gas-motor engines of present construction the slide for regulating the admission of the combustible charge is kept up to the cylinder-face by a spring sufficiently strong to resist the gaseous pressure generated in the cylinder by the combustion of the charge, and considerable disadvantage results from the consequent friction and wear caused by this constant pressure of the spring.

According to our present invention, we remedy this evil by causing the gaseous pressure inside the cylinder itself, directly or indirectly, to press the slide against the face on which it works with sufficient force to prevent the escape of gas through the port, while at other times the slide is only kept up to its face by a light spring.

In gas-motor engines the ignition of the combustible charge is frequently effected by filling a cavity in the slide with gaseous combustible mixture, which, after having been ignited by contact with a small gas-flame, is, by the motion of the slide, brought in front of the cylinder-port, and thus ignites the charge in the latter.

In engines wherein the combustible charge is introduced into the cylinder in a state of compression, or is compressed while in the cylinder, as described in the specification to the before-mentioned patent of N. A. Otto, this mode of igniting the charge is subject to the disadvantage that when the said cavity, with its burning charge at atmospheric pressure, is brought in front of the cylinder-port, the compressed gaseous charge in the latter, in rushing back into the said cavity, is apt to force the burning charge back into the gas-supply pipe, and so extinguish it, preventing the ignition of the cylinder-charge.

According to our present invention, we obviate this difficulty by establishing an equilibrium of pressure between the slide-chamber and the interior of the cylinder, a little before the opening of the slide to the cylinder, this result being attained by effecting a communication between the two parts by a restricted passage or channel, at the time referred to, through which the compressed gas can flow into the slide-cavity, but not with such force or in such a way as to produce the before-mentioned prejudicial effect, or cause ignition of the cylinder-charge before the slide-cavity communicates direct with the port.

The accompanying drawings show our improved construction of gas-engine, embodying the before-described several parts of our invention, as also some other parts thereof, which will be presently referred to.

The piston A of the cylinder B is connected by the rod C to the crank-shaft D, with fly-wheel E. The slide F is actuated by the rod $G^2$ from the crank G on the way-shaft $G^1$, which is driven from the shaft D by gearing H, so proportioned that the shaft $G^1$ makes one revolution, and, consequently, the slide one to and fro motion, for every two revolutions of D, the engine being intended to work generally in the same manner as that described in Otto's before-mentioned patent—that is to say, the gaseous charge being drawn in by the one out-stroke of the piston, compressed by the following instroke, then fired so as to cause the piston to perform its next outstroke, the products of combustion being expelled by the following instroke.

Figure 3:
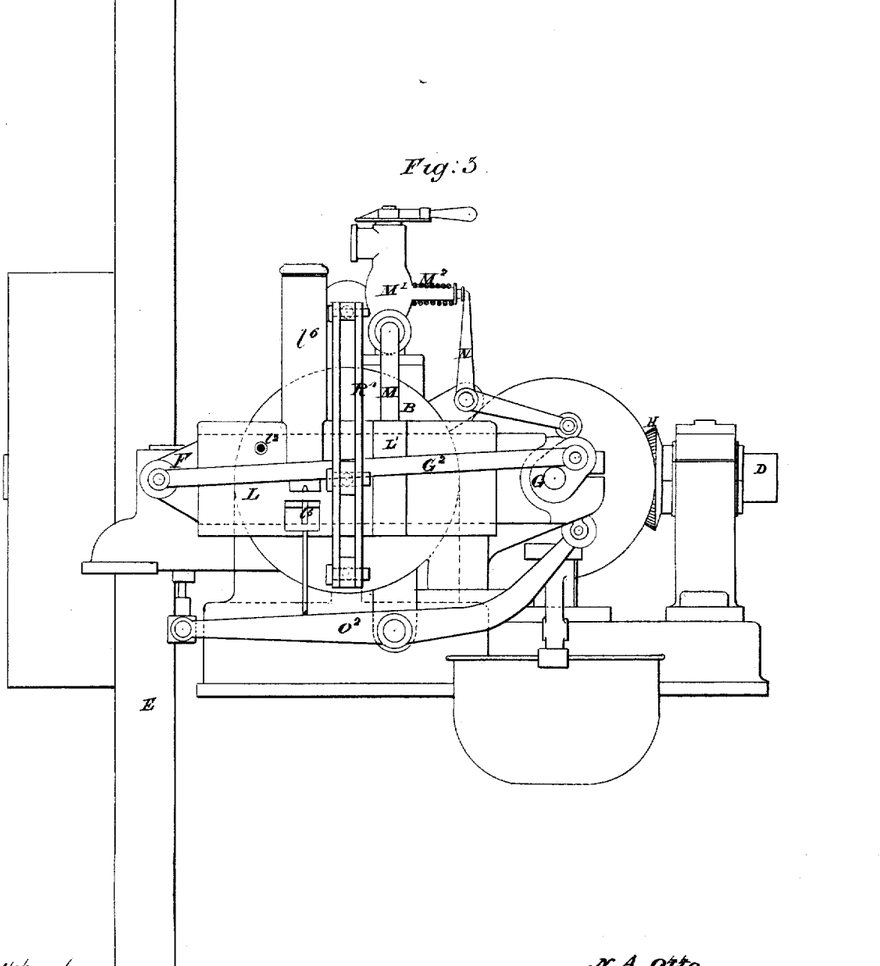
Fig. 3, an end elevation.
Figure 4:
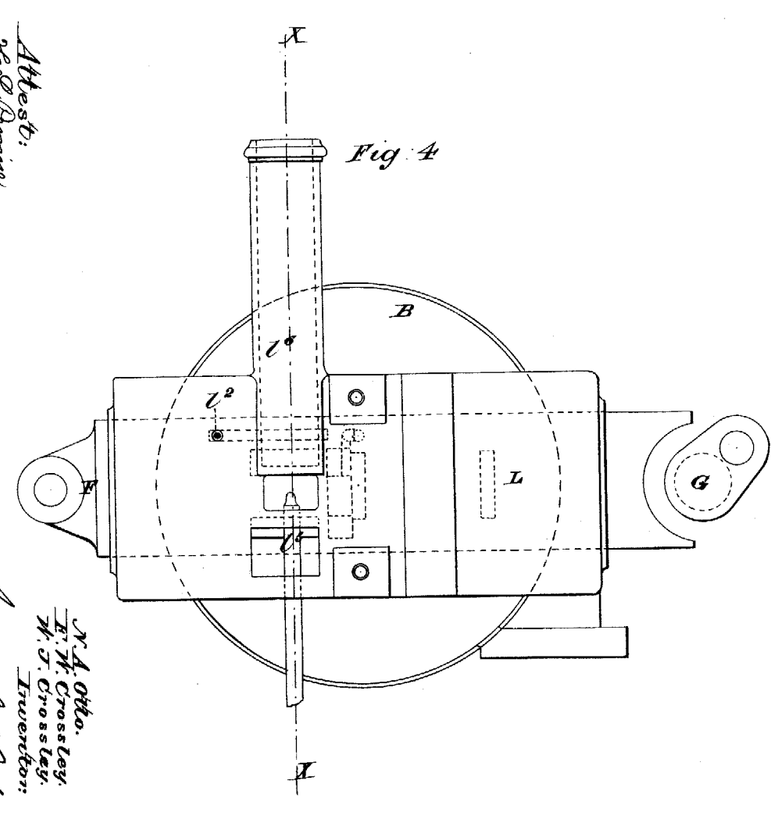
Fig. 4 shows an enlarged end view of the cylinder and slide.
Figure 5:
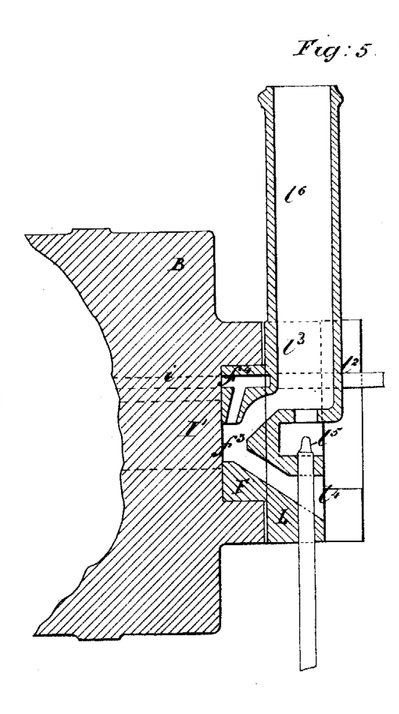
Fig. 5 shows a vertical section on line X X, Fig. 4.
Figure 6:
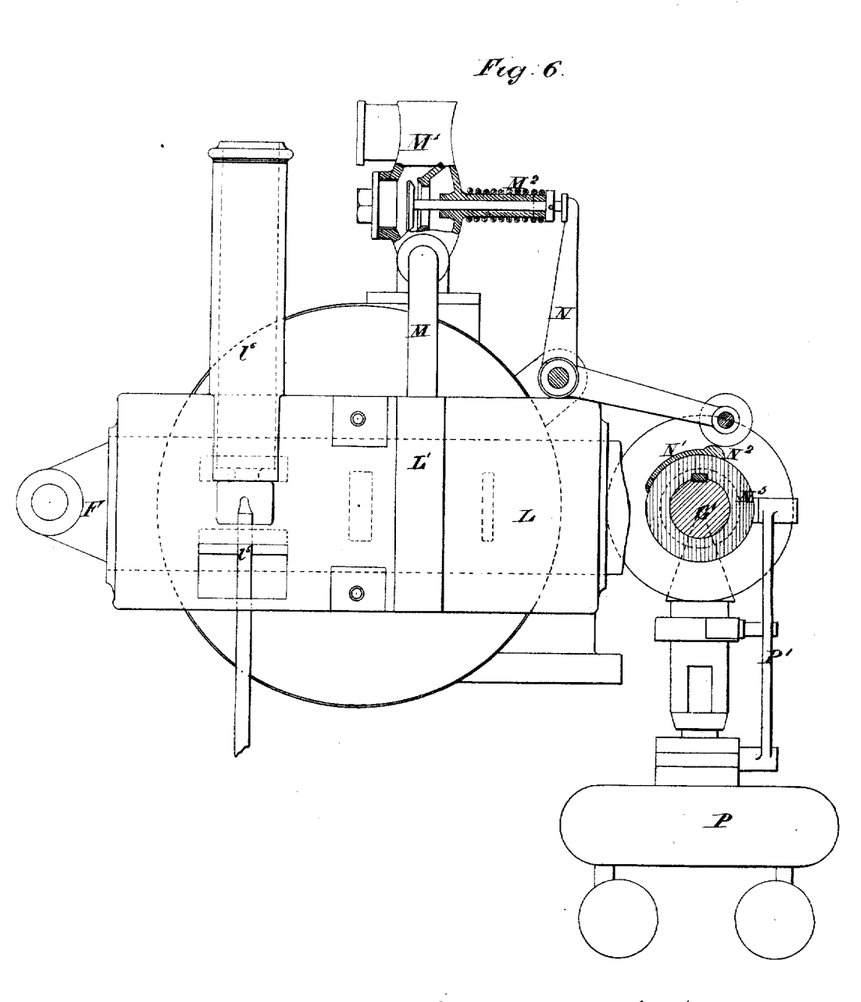
Fig. 6 is an enlarged sectional end view of the cylinder, showing the cam and gear for working the gas-valve.

The gaseous charge is introduced into the cylinder and fired, after compression, in the following manner: From the end of the cylinder a long narrow passage, I, extends to the port I', formed in the cylinder-face, against which the slide F works, the passage I being, by preference, made to project into the cylinder, as shown, for a purpose to be presently described. In the slide F is formed a passage, $f^1$, which, when moved into the position in which its one orifice is situated over the port I', establishes a communication between the cylinder and the inlet-passage K for atmospheric air. At the same time the perforations $f^2$ in the slide communicating with the passage $f^1$ are brought opposite the passage $l^1$ in the slide-cover L, into which combustible gas is introduced through the pipe M, so that combustible gas issues in small divided jets through the perforations into the passage $f^1$, so as to mix intimately with the air entering the cylinder, thus forming the combustible charge. The passage of the gas is controlled by means of the valve $M^1$, which is kept closed by means of a spring, $M^2$, (see Fig. 3,) and is pushed open at the proper time by means of a lever, N, actuated by a cam, $N^1 N^2$, (see Fig. 6,) on the shaft $G^1$. The part $N^1$ of this cam being of less height than the part $N^2$, it follows that, during nearly the whole of the time that the piston, by its outstroke, is drawing in the gaseous mixture, the gas-valve is opened to so small an extent as to admit only such a proportion of combustible gas to mix with the air as will produce the before-described weak or diluted compound, while, when the cylinder has nearly received its full charge, the valve $M^1$, before closing, is suddenly opened to a greater extent for a short time by the action of the part $N^2$ of the cam, whereby a greater proportion of gas will be admitted with the air, constituting the strong compound with which the passage I is charged. On igniting this strong charge, by means of a small quantity of burning gas conveyed to the port I' in the cavity $f^3$ of the slide, the resulting flame will be projected with force into the cylinder, thus coming into extended contact with the uniformly-diluted charge therein, and effecting its rapid combustion, as before described. As, for the purpose of effecting the compression of the charge within the cylinder, there must exist a space in the latter behind the piston when at end-stroke for containing the compressed charge, as shown on the drawing, this space must of necessity retain some of the gaseous products of combustion when the piston on its return-stroke expels the latter through the escape-valve O. As the following combustible charge must mix with these products on entering the cylinder, we insure their mixing uniformly therewith by means of the peculiar projecting mouth of the passage I, whereby, instead of the combustible charge pushing the products of combustion in front of it as it enters, and thus retaining the two in a stratified condition, as was the case with the conical form of cylinder described in Otto's before-mentioned patent, the combustible charge is projected in the form of a jet into the cylinder, and thus becomes effectually mixed with the products of combustion therein.

By means of this form of the passage I it is possible to produce the before-described uniformly-diluted charge when operating in a similar manner to that described in the said patent of Otto—that is, by first introducing into the cylinder a charge of atmospheric air, and then a charge of strong combustible mixture, as the latter, in entering in a jet, as described, will become effectually mixed with the charge of air, thus producing the diluted charge, while the last portion of the combustible mixture filling the passage I will constitute the strong charge.

Figure 11:
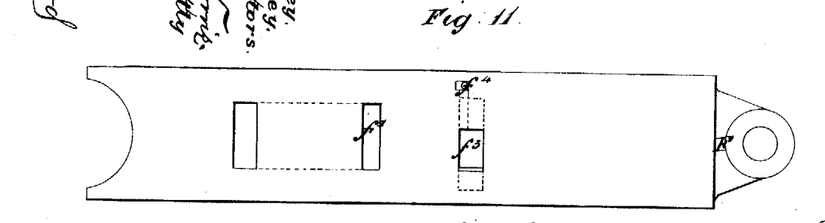
Figs. 11, 12, and 13 show, respectively, the inner face, the outer face, and a sectional plan of the slide detached.
Figure 12:
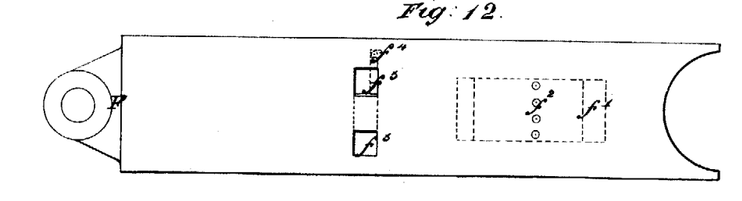
Figure 13:
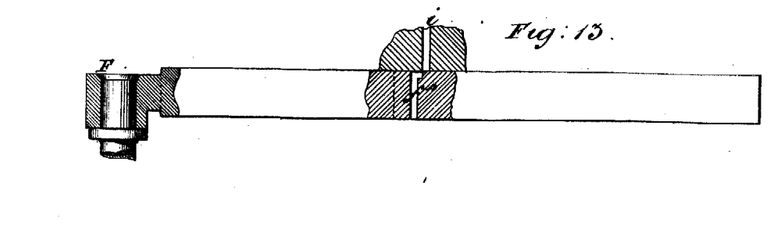
Figure 14:
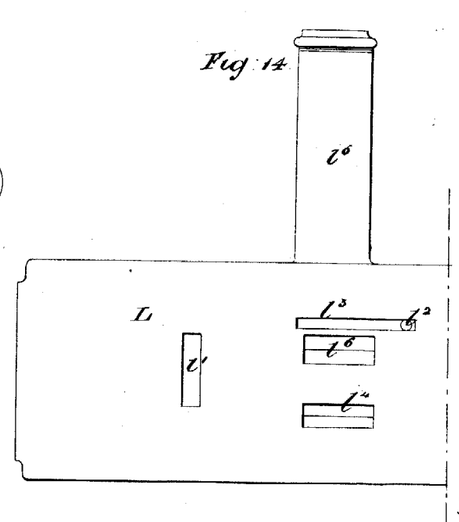
Fig. 14 shows the inner face of the slide-cover.

The passage $f^3$ is charged with combustible gas from a pipe, $l^2$, opening into a channel, $l^3$, in the slide-cover L, with which the passage $f^4$, leading into $f^3$, communicates. At the same time air enters $f^3$ through an opening, $l^4$, in the slide-cover, and the mixture of gas and air thus produced is ignited by the small gas-flame $l^5$ kept burning in the chimney $l^6$ on the slide-cover. By the motion of the slide the chamber $f^3$, with its ignited charge, is then moved away from the flame $l^5$, and brought in front of the port I' for firing the charge; but before $f^3$ opens to the port I' the small passage $f^4$ is caused, by means of a lateral notch, (shown more clearly at Figs. 11, 12, and 13,) to communicate with the small passage $i$ leading into the cylinder, whereby the pressure of the compressed charge in the latter will be transmitted to the charge in $f^3$ before this opens to the cylinder, and thus, the pressure in the cylinder and valve-chamber being *in equilibrio*, the extinguishing of the flame by the rushing in of the compressed gases, as before described, is prevented.

Instead of providing the special passage $i$, communicating with the cylinder, the lateral notch of the passage $f^4$ might be so formed as to communicate with the port I' of the cylinder; or a notch might extend laterally from the cavity $f^3$ itself for this purpose.

The power of the engine is regulated by the governor P, driven from the shaft $G^1$, by entirely cutting off the supply of combustible gas, and thus preventing the introduction of a combustible charge into the cylinder when the engine is running beyond the normal speed. For this purpose the cam $N^1 N^2$, carried on a sliding sleeve, $N^3$, actuated by the governor P and lever $P^1$, is only made slightly wider than the roller on the lever N, and when the engine is running at its normal speed the governor holds the sleeve $N^3$ in the position shown at Fig. 15, in which the cam is directly under the roller of the lever N. When, by the rising of the governor-balls, consequent upon an increase of speed, the sleeve $N^3$ is pushed to the left hand, the cam is moved from under the lever, as indicated by dotted lines in Fig. 15, it being thus prevented from affecting the opening of the gas-valve $M^1$, so that the engine continues its motion without a fresh combustible charge being introduced until, by the reduction of the speed, the cam is brought under the lever again.

Figures 1, 15:
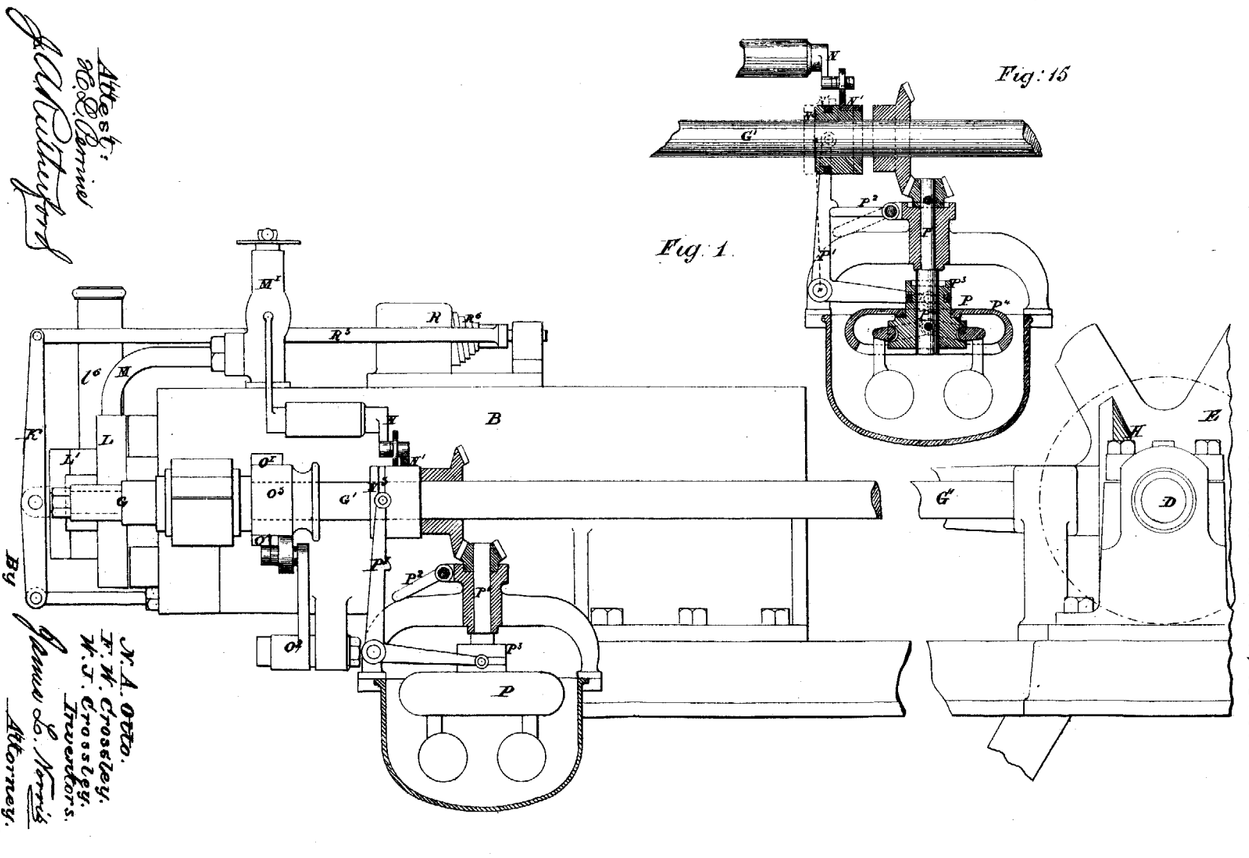
Figure 1 shows a side elevation of the engine.

Should the sleeve $N^3$ and cam $N^1 N^2$ be prevented from moving farther to the right than the position shown in full lines at Fig. 15, it might happen that, if from overwork or accident, when the engine comes to a stand-still, the cam would be just in the position in which it holds the gas-valve open, in which case gas might leak out through the slide and air-passage K of the engine. To prevent this the sleeve and cam are so arranged that, when the engine comes to a stand-still, the governor P, in falling, moves the lever $P^1$, and with it the sleeve, into the position shown in Fig. 1, in which it will be seen that the cam is moved from under the lever N in the same manner as, but in the opposite direction to, that in which it is moved by the governor when the engine is running too fast, so that, whatever position the cam may be in when the engine stops, the gas-valve will remain closed. As, in order to start the engine again, it is necessary to bring the cam into position for actuating the gas-valve again at the proper time, before this can be effected by the governor the sleeve is, in the first instance, moved into the position shown at Fig. 15, by hand, and is temporarily held there by means of the small strut $P^2$, hinged loosely to the governor, which is raised into the position shown, so that the lever $P^1$ rests against it. On the engine being started, the action of the governor will, on the attainment of the normal speed, move the lever somewhat to the left, thus allowing the strut $P^2$ to fall into the position shown at Fig. 1, so that the sleeve $N^3$ is again free to move to the right when the engine stops.

The arms of the governor-balls are pivoted to a pin, $P^6$, passing through slotted holes in the sleeve $P^3$, and carried by the spindle $P^5$, the sleeve $P^3$ being made to rise and fall by the action of the fingers on the governor-arm, as shown at Fig. 15.

$P^4$ is a loose weight, which, when the governor-balls drop, owing to the engine running below the normal speed, rests upon the projecting ends of the pin $P^6$, and does not act upon the governor. When, however, the engine attains its normal speed, a shoulder on the sleeve $P^3$ lifts the weight $P^4$ off the pin, thus loading the governor to a greater extent, so that although the cam $N^1$ is readily brought into position by the governor for actuating the gas-valve, when the engine is running at a slow speed, yet it is not moved beyond that point, so as to cut off the gas-supply again until the normal speed is attained.

Figure 8:
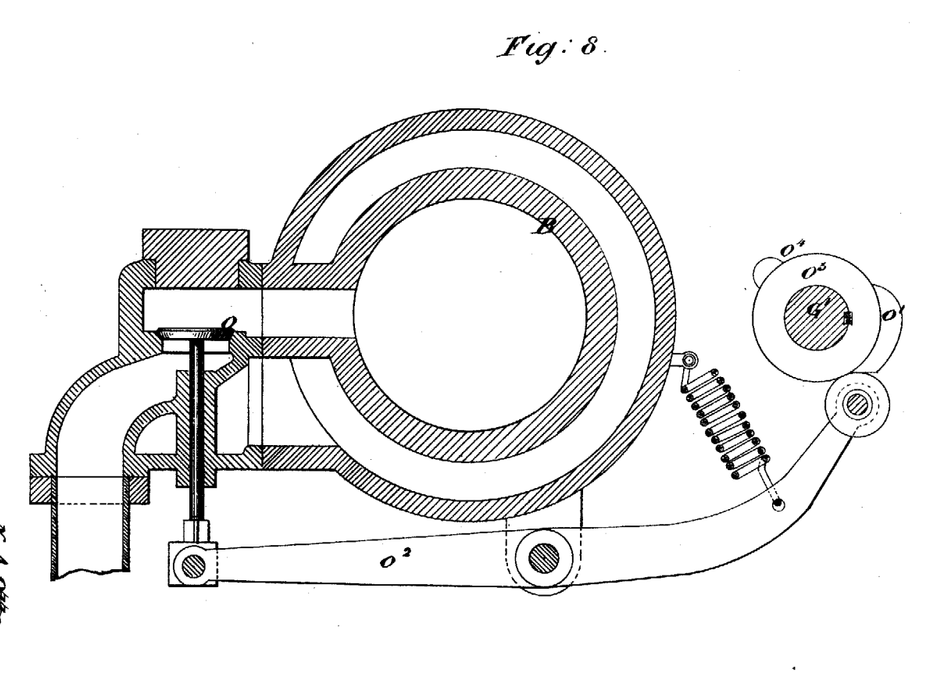
Fig. 8 shows a cross-section on line Y Y, Fig. 7.

The opening of the escape-valve O, for the escape of the products of combustion on the return-stroke of the piston, is effected by the cam $O^1$ acting on the lever $O^2$, which is connected to the stem of the valve, as shown at Fig. 8.

Figure 2:
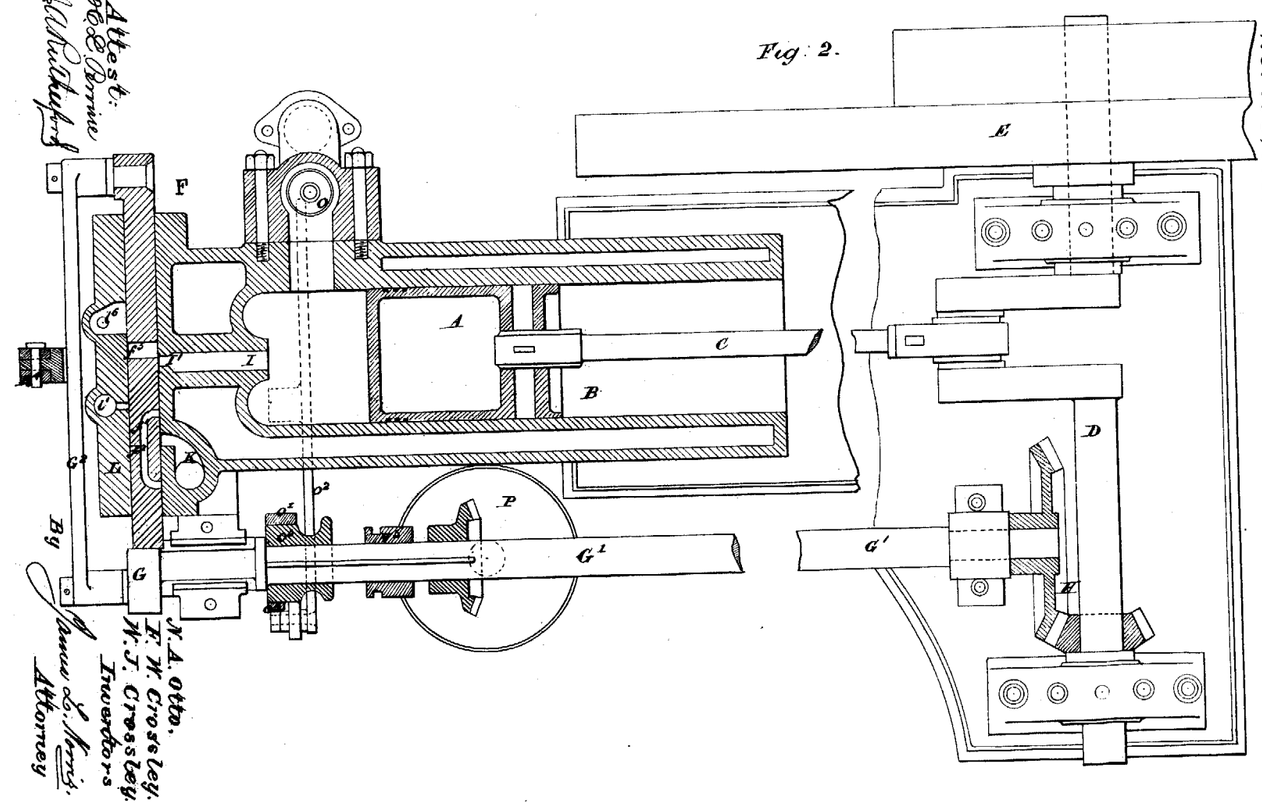
Fig. 2 shows a sectional plan.
Figure 7:
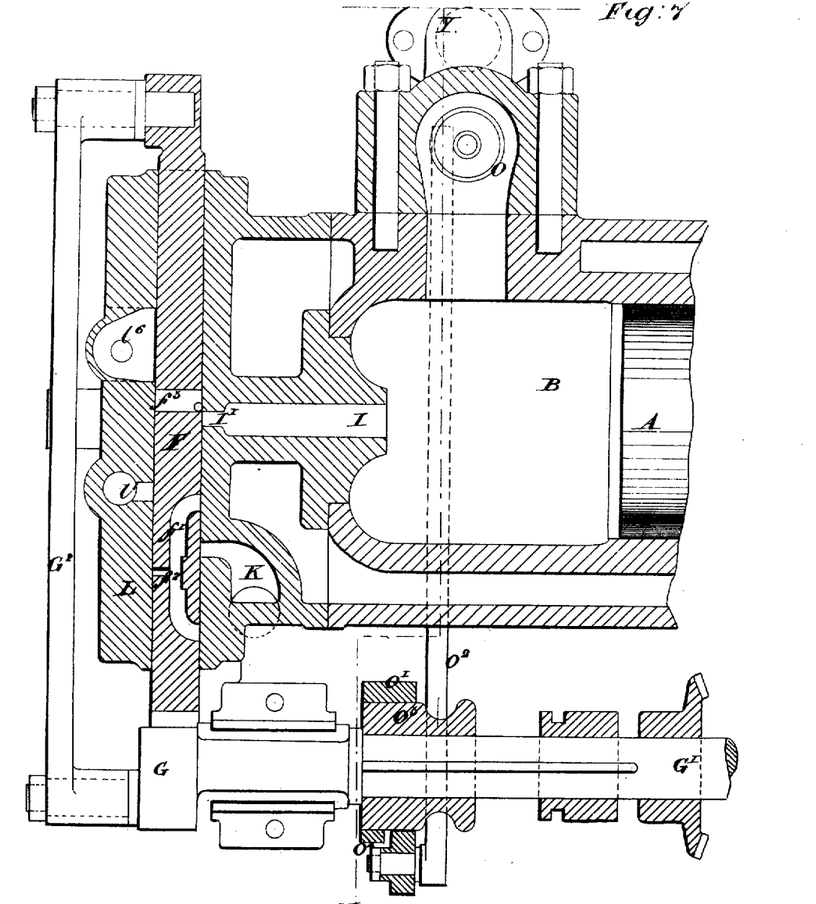
Fig. 7 shows an enlarged sectional part plan of the engine.
Figure 16:
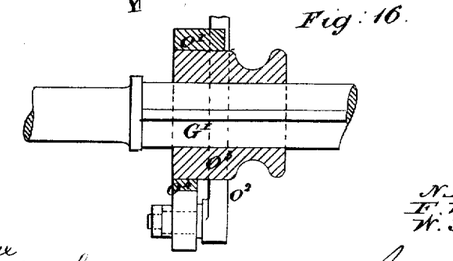

On starting the engine it requires to be worked by hand, in order, first, to draw in the combustible charge by the outstroke of the piston, and, secondly, to compress the charge by the following instroke before the ignition thereof is effected. In engines of large size the power required to effect this compression of the charge is so considerable as to render the manual labor inconveniently heavy. In order to obviate this inconvenience the cam $O^1$ is mounted upon a sliding sleeve, $O^3$, upon which is formed a second small cam or tappet, $O^4$, which is only partly as wide as $O^1$. When the engine is at work the sleeve $O^3$ is in the position shown at Figs. 1, 2, and 7, in which the cam $O^1$ does not act on the roller of the lever $O^2$, and the valve O is consequently only opened during that instroke of the piston during which the products of combustion are expelled. On starting the engine, however, the sleeve $O^3$ is moved by hand into the position shown at Fig. 16, in which case the cam $O^4$ is caused to act on the lever $O^2$ so as to open the escape-valve for a short time, when the piston commences the instroke, during which the combustible charge is compressed. By this means a portion of the charge just drawn in is allowed to escape again, in consequence of which the compression only begins when the piston has partly performed its stroke, and, the degree of compression being thus much less than under ordinary circumstances, it is easily effected by hand. The engine being started, the sleeve $O^3$ is pushed back into its original position, so as to put the cam $O^4$ out of action again.

Figure 9:
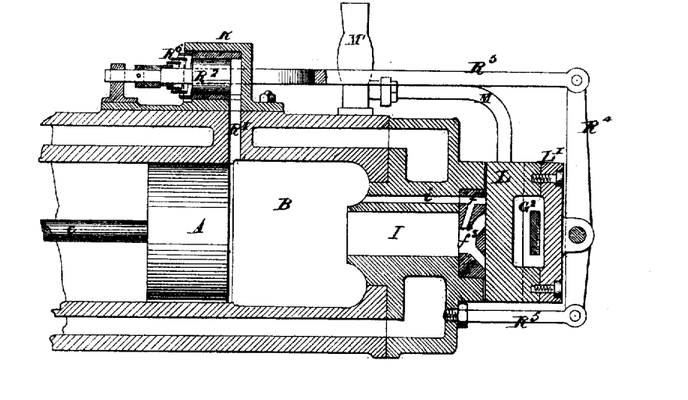
Figs. 9 and 10 show, respectively, a part vertical longitudinal section and a part plan of the cylinder.
Figure 10:
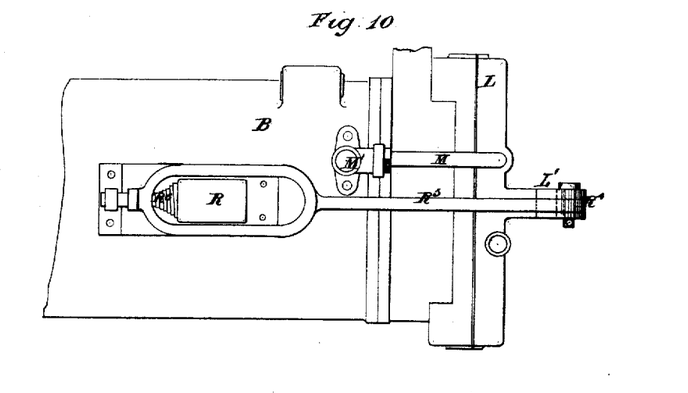

At the top of the cylinder B is a small cylinder, R, (see Fig. 9,) communicating with the interior of the cylinder B by a passage, $R^1$, and having a piston, $R^2$, which is connected by a link, $R^3$, to one end of a lever, $R^4$. The other end of this lever is pivoted to a rod, $R^5$, projecting from the cylinder, and at an intermediate point it is connected to a bridge-piece, $L'$, on the cover L. The slide-cover is not fixed to the cylinder, but bears against the outer face of the slide. Thus, on the compression of the charge in the cylinder, as also on the ignition of the charge, the pressure produced in the cylinder is caused to force the piston $R^2$ outward, and thus, by means of the link $R^3$ and lever $R^4$, to press the slide-cover against the cylinder-face with sufficient force to prevent any escape of gas from the cylinder.

During the time when the pressure in the cylinder does not exceed that of the atmosphere the slide is merely held up against the cylinder-face by means of a light spring, $R^6$, acting on the link $R^3$ and lever $R^4$.

It will be evident that other devices may be employed for causing the pressure in the cylinder to effect the close contact between the slide and the face against which it works. Thus, this face might be made as a loose piece, with a cylindrical projection fitting gas-tight into an enlarged cylindrical passage leading into the cylinder, the port and passage for the introduction and ignition of the charge being formed in this cylindrical projection. On pressure being produced in the cylinder, such pressure, in acting against the end of the cylindrical projection as a piston, will press the loose face against the slide, and the latter against the slide-cover, which, in this case, is fixed to the cylinder. Or a portion of the back face of the slide may be inclosed within an annular packing-ring fitting against the cover, and a communication is established by a small passage between this inclosed space and the interior of the cylinder, so that on the production of pressure in the latter this will be conveyed to the said inclosed space, so as to press the slide against the cylinder-face.

Having thus described the nature of our invention, and in what manner the same is to be performed, we claim—

1. The combination, in a gas-motor engine, of a cylinder containing a weak or diluted combustible uniform mixture of gas and air with a separate passage or chamber containing a strong or undiluted mixture of gas and air, and provided with an igniting slide or valve, substantially as set forth.

2. The combination, in a gas-motor engine, of the cylinder and slide-chamber, containing the igniting-flame, with a suitable device for producing an equilibrium of pressure therein, just before said slide-chamber opens into the cylinder, substantially as set forth.

3. The combination, with the main cylinder of a gas-motor engine, of a connected smaller cylinder having a piston and a rod connected with a system of levers for producing pressure upon the back of the slide, substantially as and for the purpose set forth.

4. In a gas-motor engine, the central passage I to the cylinder operating in combination with the slide F, gas-pipe M, and valve $M^1$, lever N, and cam $N^1$ $N^2$, constructed as described, for first introducing a weak charge of gas and air into the cylinder and then a strong charge into the said passage, substantially as and for the purpose herein set forth.

5. In a gas-motor engine, the passage I, made to project centrally into the cylinder, whereby the air and gas entering through the same become uniformly mixed with each other and with the gases already contained in the cylinder, substantially as herein described.

6. In a gas-motor engine wherein the charge is under compression, the passage $f^4$ in the slide communicating with the cavity $f^3$, and so formed as to communicate with the interior of the cylinder just before the cavity $f^3$ communicates directly therewith, in order to establish an equilibrium of pressure between the cylinder and slide-cavity, substantially as herein described.

7. In a gas-motor engine, the cylinder R, communicating with the cylinder B, and having a piston, $R^2$, acting on a lever, $R^4$, so as to press the slide against the cylinder-face when excess of pressure exists in the cylinder B, substantially as and for the purpose herein described.

8. In a gas-motor engine, a cam for working the gas-valve arranged to be slid by the governor entirely to one side of the lever of the gas-valve when the engine runs too fast, so that the cam cannot effect the opening of the gas-valve until the speed of the engine is reduced, substantially as and for the purpose herein described.

9. In a gas-motor engine, a cam for working the gas-valve arranged to be slid by the governor entirely to one side of the lever of the gas-valve when the engine stops, so that the cam cannot be in position for holding the gas-valve open when the engine stops, substantially as herein described.

10. In combination with a sliding cam for working the gas-valve, and operating as set forth, a strut for temporarily holding the cam in position for actuating the gas-valve while the engine is being started, substantially as herein described.

11. In a gas-motor engine, the combination of the piston, exhaust-valve, operating-levers, and an automatic ungearing or releasing device, substantially as and for the purpose set forth.

12. The before-described improved gas-motor engine, wherein a weak combustible charge in the cylinder is fired by a strong combustible charge in a separate passage, in combination with means, constructed substantially as shown, for establishing an equilibrium of pressure between the cylinder and the slide-cavity containing the igniting-flame, and for causing the pressure in the cylinder to effect the requisite close contact between the slide and the face against which it works.

In testimony whereof we have signed our names to this specification in the presence of two subscribing witnesses.

NICOLAUS AUGUST OTTO.
FRANCIS WILLIAM CROSSLEY.
WILLIAM JOHN CROSSLEY.

Witnesses to the signature of the said Nicolaus August Otto:
GUSTAV KLEINJUNG,
FRIEDRICH ALBERT SPIECKER.

Witnesses to the signatures of the said Francis William Crossley and William John Crossley:
DELACHEROW HASTINGS IRWIN,
WILLIAM H. TAYLOR.